United States Patent
Vrana et al.

(10) Patent No.: US 7,417,847 B2
(45) Date of Patent: Aug. 26, 2008

(54) COMPACT CURRENT TRANSFORMER CASING FOR GAS-INSULATED SWITCHGEAR ASSEMBLIES

(75) Inventors: Ales Vrana, Richterswil (CH); Miguel Garcia, Dubendorf (CH); Walter Holaus, Zurichl (CH); Urs Baur, Rafz (CH)

(73) Assignee: ABB Technology AG, Zurich (CH)

( * ) Notice: Subject to any disclaimer, the term of this patent is extended or adjusted under 35 U.S.C. 154(b) by 283 days.

(21) Appl. No.: 11/066,193

(22) Filed: Feb. 25, 2005

(65) Prior Publication Data

US 2005/0190032 A1 Sep. 1, 2005

(30) Foreign Application Priority Data

Feb. 27, 2004 (EP) .................................. 04405118

(51) Int. Cl.
  *H02B 5/00* (2006.01)
  *H01F 38/20* (2006.01)
(52) U.S. Cl. ........................ 361/620; 361/604; 361/612; 361/618; 336/174
(58) Field of Classification Search ................. 361/620, 361/604, 612, 618; 336/174
  See application file for complete search history.

(56) References Cited

U.S. PATENT DOCUMENTS

| 6,014,072 A * | 1/2000 | Gimeno et al. ............... 336/173 |
| 6,700,471 B2 * | 3/2004 | Kakuda et al. ............... 336/174 |

FOREIGN PATENT DOCUMENTS

| DE | 43 22 944 | 5/1994 |
| DE | 100 15 800 | 10/2000 |
| FR | 2 792 452 | 10/2000 |
| JP | 07274326 A | * 10/1995 |
| JP | 09232170 A | * 9/1997 |
| JP | 2000037009 A | * 2/2000 |
| JP | 2000125425 A | * 4/2000 |
| JP | 2000175315 A | * 6/2000 |
| JP | 2001186611 A | * 7/2001 |
| JP | 2002271925 A | * 9/2002 |

OTHER PUBLICATIONS

JPO machine translation of the specification of JP/2000-125,425 (of record).*
Mamoru Okabe et al.; Serialization of Standard Gas Insulated Switchgear; Hitachi Review vol. 51, No. 5, Year: 2002.

* cited by examiner

*Primary Examiner*—Anatoly Vortman
(74) *Attorney, Agent, or Firm*—Buchanan Ingersoll & Rooney PC

(57) ABSTRACT

The invention pertains to a current transformer (1') for enclosed, gas-insulated high-voltage switchgear (10). According to the invention, a current transformer (1') is characterized in that a removable installation flange (12, 12') is provided on a fill opening (3c) of the core carrier (11) for one-piece current transformer cores (2). Among other things, embodiments pertain to: a removable installation flange (12, 12') in the form of a two-part clamping flange (12) or in the form of a one-piece rotary flange (12') that is screwed on the fill opening (3c) similar to a bayonet catch. Among other things, the attained advantages are: radially increased installation space for one-piece current transformer cores (2); reduced diameter (d) for one-piece current transformer cores (2) and reduced structural volume of the current transformer casing (11a).

11 Claims, 4 Drawing Sheets

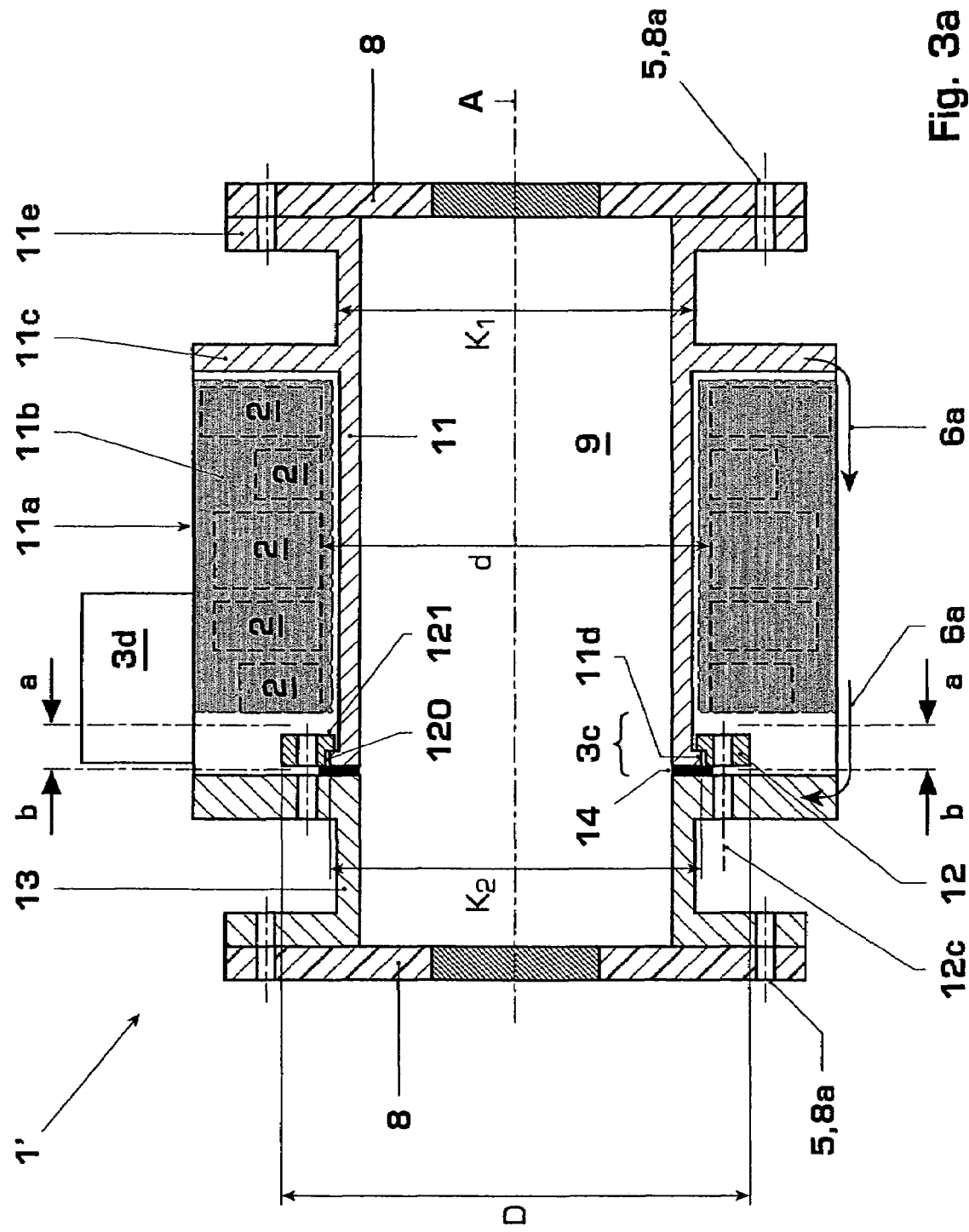

COMPACT CURRENT TRANSFORMER CASING FOR GAS-INSULATED SWITCHGEAR ASSEMBLIES

TECHNICAL FIELD

The invention pertains to the field of high-voltage engineering, particularly to electrical measuring techniques in encapsulated gas-insulated switchgear (GIS). The invention is based on a current transformer casing and a gas-insulated switchgear according to the preambles of the independent claims.

STATE OF THE ART

A gas-insulated switchgear (GIS) is disclosed in the article "Serialization of Standard Gas Insulated Switchgear" by M. Okabe et al., Hitachi Review Vol. 51 (2002), No. 5. The GIS comprises switches and conductor rails or busbars for the energy distribution. Current transformers are arranged on power supply lines and outgoing power lines for current measurement purposes.

Typical current transformers comprise current transformer cores of ferrite that are seated on a core carrier tube and annularly enclose the conductor. The current transformer cores are designed for various current measuring tasks and current measuring ranges. This means that current transformer cores of different sizes and quantities are usually required in a current transformer. Current transformer cores consisting of two parts are less accurate and more expensive than one-piece transformer cores. One-piece current transformer cores need to be successively slipped on the core carrier tube during the assembly. The filled core carrier tube is then installed on the GIS housing with screw-type flanges. In this case, the inside diameters of the one-piece current transformer cores need to be larger than the outside diameter of the screw-type flanges. This requires a correspondingly large installation space for the current transformer casing and increases the costs for the current transformer accordingly.

In one solution known from the state of the art, the core carrier tube is realized in two parts and contains a screw-type flange for connecting the two halves in the center, wherein the two halves are tapered toward the screw-type flange such that the outside diameter of the screw-type flange is reduced. However, it is disadvantageous that the spacing between the active parts and the housing of the GIS is reduced in the tapered region such that there is a higher risk of electrical flashovers.

DESCRIPTION OF THE INVENTION

The present invention is based on the objective of disclosing a more compact current transformer for gas-insulated switchgears. According to the invention, this objective is attained by the features of the independent claims.

The invention proposes a current transformer, particularly for enclosed, gas-insulated high-voltage switchgear, that comprises a current transformer casing and at least one current transformer core that is arranged on a core carrier tube and serves for measuring a current flowing through a conductor of the switchgear, wherein the core carrier tube contains a fill opening for slipping or sliding on the current transformer core on the core carrier tube, wherein the core carrier tube can be connected to the GIS housing of the switchgear by means of flanges, wherein the fill opening is additionally provided with a mounting contour that serves for absorbing axial forces and the outside diameter of which is smaller than an outside diameter of an installation flange for the core carrier tube, i.e., smaller than a flange outside diameter, and wherein a mounting means that serves for the installation of the core carrier tube in the region of the fill opening can be mounted on the mounting contour. The term flange outside diameter refers to the outside diameter of a conventional flange as it is typically utilized for the switchgear in question, for example, a flange that is connected by means of axial screws or the like. The outside diameter of the mounting contour consequently should be smaller than that of a conventional installation flange for the core carrier tube. In other words, the mounting contour shall have an outside diameter that is only insignificantly larger than the contact tube outside diameter, i.e. than the outside diameter that is relevant for receiving and seating the current transformer cores to be slipped on. The invention provides various advantages. The installation space for current transformer cores to be slipped on is increased by the difference in height between the mounting contour according to the invention and a conventional flange while the other dimensions remain the same. The costs for all current transformer cores are reduced because less iron core material is required if the inside diameter is reduced. In addition, a very simple assembly and disassembly of the current transformer and, in particular, of its current transformer cores are achieved. An altogether very compact design is realized, and a large structural space is made available for the current transformer cores in the current transformer casing.

In a first embodiment, the mounting means, after being mounted on the mounting contour, forms an installation flange for the installation of the core carrier tube in the GIS housing in the region of the fill opening. This means that such an installation flange that is mounted subsequently, i.e., after slipping on the transformer cores, no longer limits the construction volume of the transformer. The installation flange to be mounted on the mounting contour may also have an outside diameter that is larger than the inside diameter of the transformer cores, namely because the transformer cores do not have to be slipped over this installation flange.

In another embodiment, the mounting contour contains a projection that projects radially outward on the fill opening, wherein said projection engages with a groove on the mounting means and transmits axial forces acting upon the mounting means to the core carrier tube. This design in the form of a projection and a groove makes it possible to realize a maximum mechanical tensile strength for the installation flange to be subsequently mounted while maintaining the structural height at a minimum.

Claims 5-6 pertain to embodiments, in which a multi-part mounting means is mounted on the mounting contour and an installation flange is formed with the aid of the multi-part mounting means.

Claims 7-8 pertain to embodiments, in which a one-piece mounting means cooperates with a mounting contour that is provided with several mounting sections, particularly in the manner of a bayonet catch.

Claim 10 pertains to an electrical switchgear that comprises a current transformer of the aforementioned type with the previously discussed advantages.

Other embodiments, advantages and applications of the invention are disclosed in the dependent claims, the combinations of claims as well as the following description and the figures.

BRIEF DESCRIPTION OF THE FIGURES

The schematic figures show.

Identical components are identified by the same reference symbols in the figures.

WAYS FOR REALIZING THE INVENTION

Figure 1:
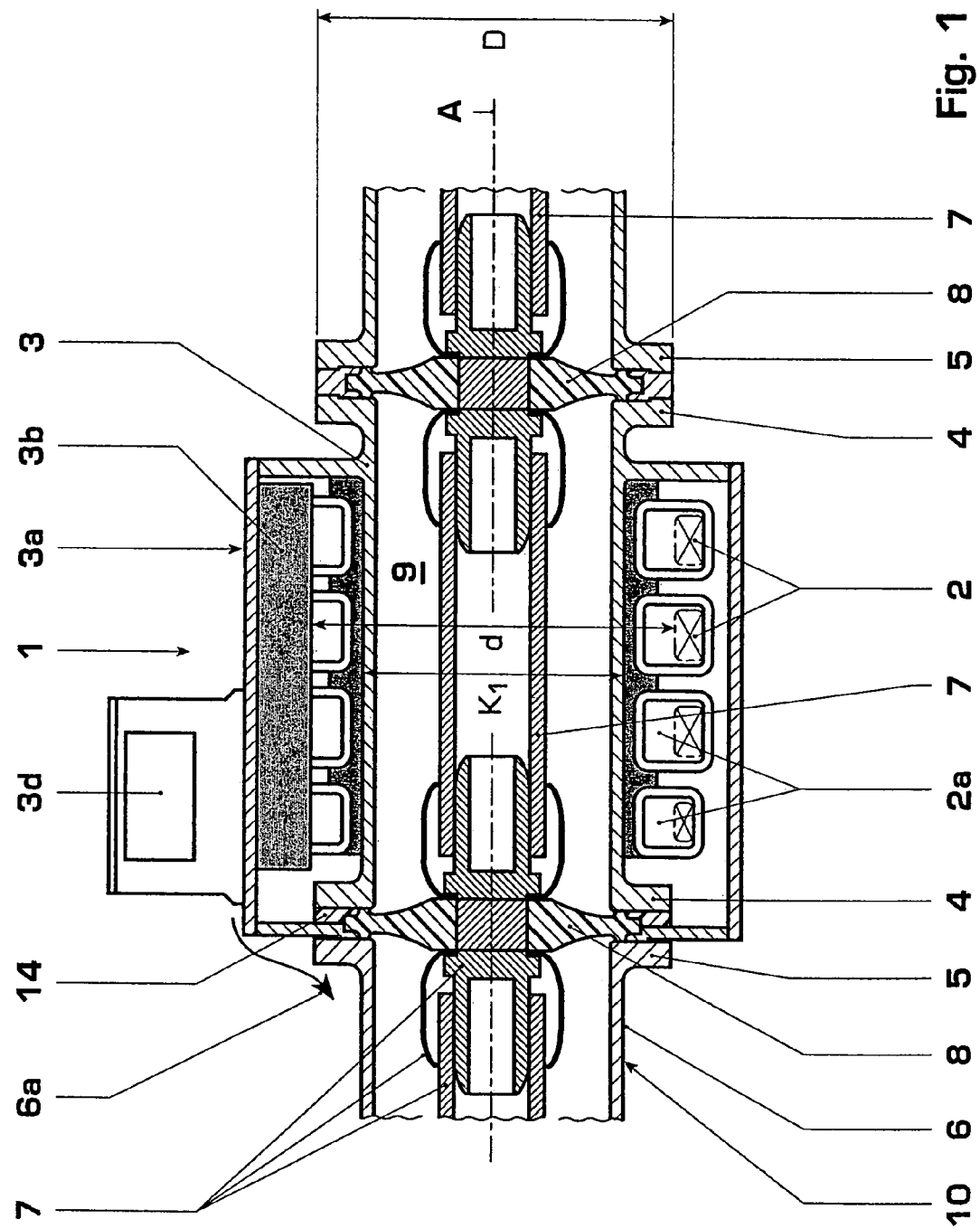
FIG. 1, a cross section through a current transformer casing according to the state of the art with several current transformer cores that are installed between two screw-type flanges.

FIG. 1 shows a conventional current transformer 1 in an enclosed, gas-insulated switchgear 10. The housing 6 of the gas-insulated switchgear 10 encloses a gas chamber 9 that is preferably filled with $SF_6$ gas that is under a pressure of a few bar. The longitudinal axis A of the switchgear section 10 extends along the conductor 7 in this case. The active parts or conductors 7 are held in the gas-filled interior 9 of the housing 6 by insulators 8, particularly post insulators 8 and partition insulators 8. The insulators 8 are supported on the GIS housing 6 by means of insulator flanges 8a.

The current transformer 1 with its current transformer casing 3a is mounted on the GIS housing 6 by means of an installation flange 4, 5. As shown, the insulator flanges 8a may be flanged together with the installation flanges 4, 5 of the current transformer 1. The current transformer casing 3a accommodates current transformer cores 2 to be slipped on, particularly one-piece current transformer cores, for which a structural volume 3b is provided. The structural volume 3b is limited radially inward in that the inside diameter d of the transformer cores needs to be larger than the outside diameter of the installation flanges 4, 5 in order to slip the transformer cores 2 on the core carrier tube 3. In the embodiment shown, the installation flanges 4, 5 are realized integrally with the core carrier tube 3. The outside diameter of the core carrier tube 3 is identified by the reference symbol $K_1$. The inwardly larger structural volume 2a is available for two-part transformer cores that do not have to be slipped on. Naturally, the outside diameter $K_1$ of the core carrier tube 11 that is relevant for receiving the current transformer cores 2 is chosen smaller than the inside diameter d of the current transformer cores 2. The reference symbol 3d identifies a terminal box for the current transformer 1. All current transformer cores 2 are arranged outside the $SF_6$ gas chamber 9. A ground current insulation 14 ensures that the reverse current is carried by the current transformer casing 3a outside the current transformer cores 2 on the ground potential via the GIS housing 6. The current that flows through the active parts 7 and needs to be determined consequently can be correctly measured by the current transformer cores 2.

Figure 2:
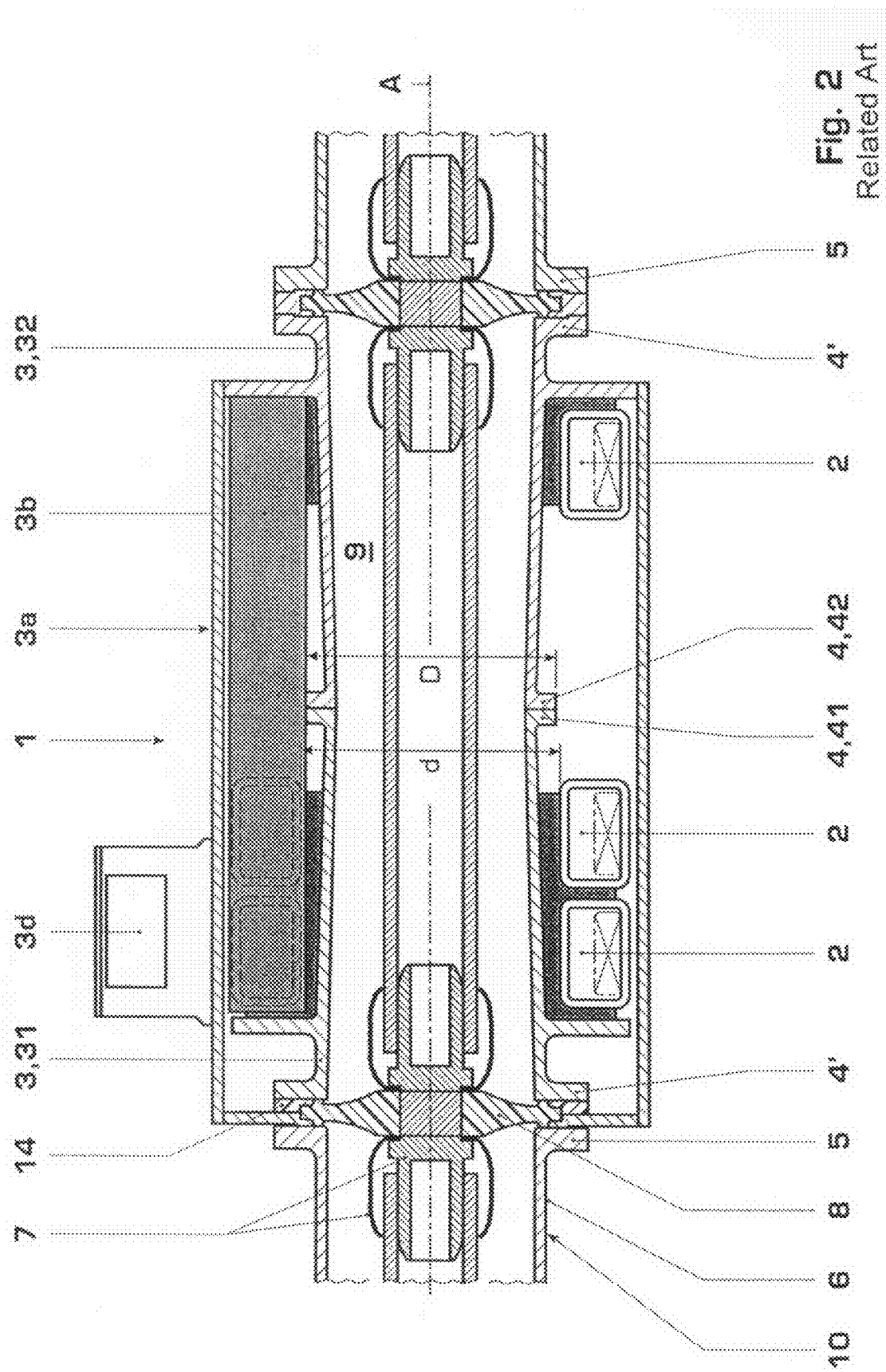
FIG. 2, a cross section through a current transformer casing according to the state of the art with a two-part core carrier tube that is tapered toward the center, and FIGS. 3a-3d, a current transformer casing according to the invention with a clamping flange to be subsequently mounted, namely in the form of a cross section (FIG. 3a) and in the form of detailed top views (FIGS. 3b-3d).

FIG. 2 also shows a conventional current transformer casing 3a, wherein the core carrier tube is realized in two parts and the two halves 31, 32 are connected to one another in a gas-tight fashion in the center by means of a flange 41, 42. The problems of the flange outside diameter D are diminished due to the fact that the core carrier tube halves 41, 42 are tapered toward the center. This leads to increased E-field strengths in the gas chamber 9 and is disadvantageous with respect to dielectric considerations.

In both embodiments, the installation flanges 4; 41, 42 that are relevant for slipping on the current transformer cores 2 are realized integrally with the core carrier tube 3; 31, 32. The installation flanges 4; 41, 42 on the core carrier tube 3 are typically realized in the form of screw-type flanges 4; 41, 42 that can be flanged on by means of axially arranged screws or the like. It is absolutely imperative that the installation flanges 4; 41, 42 project over the outside diameter $K_1$ of the core carrier tube 3 by a minimum distance. This projection always manifests itself in the form of a loss of structural volume for the current transformer cores 2.

FIGS. 3a-3d show embodiments of the invention. The current transformer 1' also comprises a current transformer casing 11a, a structural volume 11b for one-piece current transformer cores 2, a current transformer casing side wall 11c, a ground current insulation 14 in order to return the ground current 6a outside the current transformer cores 2 via the current transformer casing 11a and a core carrier installation flange 11e that is fixed on the core carrier tube 11. The invention is characterized in that the fill opening 3c is provided with a mounting contour 11d that absorbs axial forces and the outside diameter $K_2$ of which is smaller than the outside diameter D of an installation flange 11e, 12, 12', 13; 5 for the core carrier tube 11, and in that a mounting means 12, 12' that serves for installing the core carrier tube 11 in the region of the fill opening 3c can be mounted on the mounting contour 11d. The installation flange 12, 12' is also removable. The structural volume 2a for transformer cores 2 to be slipped on consequently is only limited radially inward by the height or the outside diameter $K_2$ of the mounting contour 11d on the fill opening 3c. A few embodiments of this are discussed below.

As shown in FIGS. 3a-3d, the mounting contour 11d may contain a projection 11d, 110d that projects radially outward on the fill opening 3c, wherein said projection engages with a groove 120, 120' on the mounting means 12, 12' and transmits axial tensile forces acting upon the mounting means 12, 12' to the core carrier tube 11. The mounting contour 11d may also consist of or comprise a surface structure with a surface roughness or a denticulated structure for radially clamping on a mountable installation flange. In this case, the mounting contour also serves for absorbing axial forces and for their transmission to the installation flange. A minimal structural height or a minimal outside diameter $K_2$ of the mounting contour 11d is achieved in this fashion.

Figure 3D:
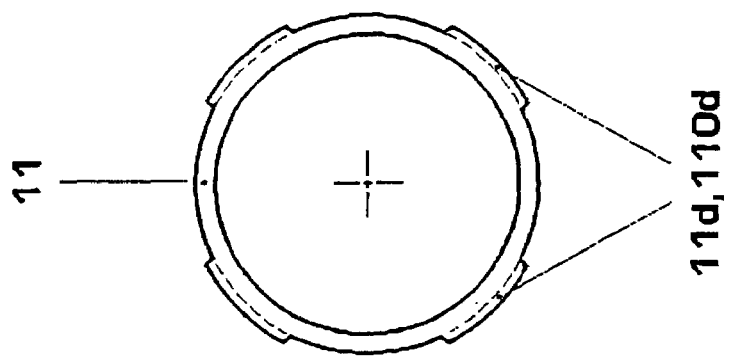
Figure 3C:
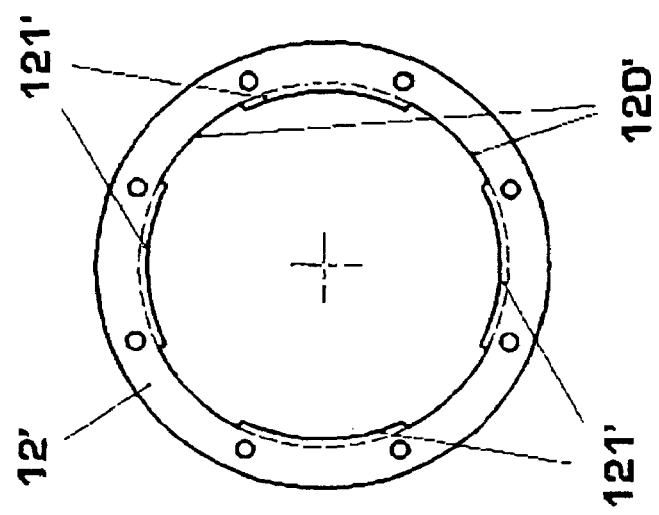
Figure 3B:
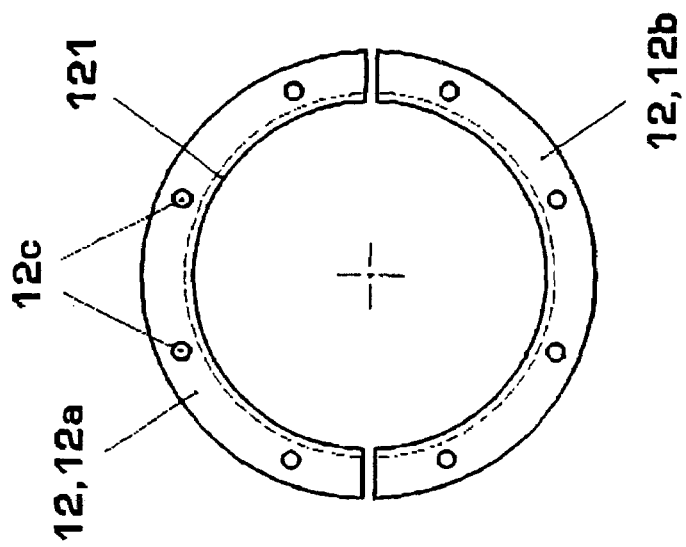

According to FIGS. 3a, 3b, the projection 11d may be annularly closed around the fill opening 3c, and the mounting means 12 may consist of two parts, particularly in the form of semi-annular parts, or even a plurality of parts (not shown). It is preferred that the mounting means 12 can be radially moved toward the mounting contour 11d when it is installed on the mounting contour 11d. The mounting means 12 advantageously consists of a clamping flange 12 that can be radially clamped on the mounting contour 11d. For this purpose, the clamping flange 12 contains a recess 120 or a groove 120 that is realized complementary to the projection 11d, as well as a tab 121 that is axially supported on the projection 11d and realized in a semi-annular fashion in this case. The clamping flange 12 can be axially flanged on a counter flange 13, 5, 8a with the aid of mounting means 12c, e.g., screws 12c, and is also radially clamped against the mounting contour 11d in this fashion.

According to FIG. 3a in connection with FIGS. 3c and 3d, the projection 11d may also comprise projecting sections 110d in the form of partial rings around the fill opening 3c, and the mounting means 12' may be realized in one-piece. In this case, the mounting means 12' preferably consists of a rotary flange 12' that contains corresponding groove sections 120' in the form of partial rings that correspond to the projecting section 110d (or complementary projections 121' in the form of partial rings), wherein the groove sections 120' serve for engaging with the projecting sections 110d analogous to a bayonet catch.

In another embodiment, an annular intermediate flange 13 is arranged between the core carrier tube 11 and the GIS housing 6 in order to mount the core carrier tube 11 on the GIS housing 6 in the region of the fill opening 3c, wherein said intermediate flange can be flanged on on both sides and functions, in particular, as a counter flange 13, 5, 8a for the mounting means 12, 12' that serves as the installation flange 12, 12'. The intermediate flange 13 may consist of a one-sided single flange or, as shown, a U-shaped intermediate flange 13. The intermediate flange 13 may also consist of a separate flange 13 or be realized integrally with another flange, e.g. an insulator flange 8a. The intermediate flange 13 can also be entirely omitted.

The current transformer 1' is particularly suitable for a gas-insulated medium-voltage or high-voltage switchgear 10. A switchgear 10 with such a current transformer 1' is also claimed.

LIST OF REFERENCE SYMBOLS

1 Conventional current transformer
1' Current transformer according to the invention
2 One-piece current transformer cores, current transformer cores to be slipped on
2a Volume for accommodating two-part current transformer cores
3 Core carrier tube
31, 32 Core carrier tube half
3a Current transformer casing
3b Structural space for one-piece current transformer cores (to be slipped on)
3c Opening for slipping on the current transformer cores, fill opening
3d Current transformer terminal box
4 Core carrier tube flange, screw-type flange on the end
41, 42 Core carrier tube flange, central screw-type flange
5 Counter flange on the GIS housing
6 GIS housing
6a Housing power terminal
7 Active parts, conductors
8 Insulator, pin insulator, partition insulator
8a Insulated flange
9 Gas chamber, $SF_6$
10 Gas-insulated switchgear
11 Core carrier
11a Current transformer casing
11b Structural space for the current transformer cores
11c Sidewall of the current transform casing
11d Mounting contour; shoulder, projection for clamping flange, clamping tab
110d Mounting contour (semi-annular)
11e Core carrier installation flange
12 Mounting means, clamping flange
12' Mounting means, rotary flange
120 Recess, groove (annular)
121 Projection, tab (annular)
120' Recess section, groove section (in the form of a partial ring)
121' Projection section (in the form of a partial ring)
12a, 12b Semi-annular clamping flanges, clamping flange elements
12c Installation means for clamping flange, screws
13 Intermediate flange
14 Ground current insulation
A Longitudinal axis of the switchgear section
d Inside diameter of the current transformer cores
D Outside diameter of the screw-type flanges, inside diameter of the structural volume for one-piece current transformer cores
$K_1$ Outside diameter of the core carrier tube
$K_2$ Outside diameter of the mounting contour, outside diameter of the clamping tab

The invention claimed is:

1. A current transformer, comprising a current transformer casing and at least one current transformer core that is arranged on a core carrier tube and serves for measuring a current flowing through a conductor, wherein the core carrier tube contains a fill opening for slipping the current transformer core on the core carrier tube, and wherein the core carrier tube is configured to be connected to a switchgear housing by means of installation flanges wherein
   a) the fill opening is provided with a mounting contour that serves for absorbing axial forces and the outside diameter of which is smaller than an outside diameter of an installation flange for the core carrier tube, wherein
   b) a mounting means that serves for the installation of the core carrier tube in the region of the fill opening is configured to be mounted on the mounting contour and wherein the mounting contour contains a projection that projects radially outward on the fill opening, wherein said projection engages with a groove on the mounting means and transmits axial tensile forces acting upon the mounting means to the core carrier tube.

2. The current transformer according to claim 1, wherein the mounting means, after being mounted on the mounting contour, forms an installation flange for the installation of the core carrier tube on the switchgear housing in the region of the fill opening.

3. The current transformer according to claim 1, wherein
   a) the outside diameter of the mounting contour forms the radially inward limitation of an installation space for one-piece current transformer cores and/or
   b) the outside diameter on the fill opening is defined by a projection that projects radially outward.

4. The current transformer according to claim 1, wherein the projection is annularly closed around the fill opening, and the mounting means consists of two parts, particularly semi-annular parts, or of a number of parts.

5. The current transformer according to claim 4, wherein
   a) the mounting means can be radially moved toward the mounting contour from outside and/or
   b) the mounting means includes a clamping flange that can be radially clamped on the mounting contour and, in particular, can be axially flanged on a counter flange with the aid of installation means.

6. The current transformer according to claim 1, wherein the projection around the fill opening comprises projecting sections in the form of partial rings, wherein the mounting means is realized in one-piece.

7. The current transformer according to claim 6, wherein the mounting means includes a rotary flange that contains groove sections in the form of partial rings that correspond to the projecting sections and engage with the projecting sections.

8. An enclosed gas-insulated electrical switchgear, comprising the current transformer according to claim 1.

9. The enclosed gas-insulated electrical switchgear of claim 8 wherein the enclosed gas insulated electrical switchgear is a high-voltage or medium voltage switchgear.

10. A current transformer, comprising a current transformer casing and at least one current transformer core that is arranged on a core carrier tube and serves for measuring a current flowing through a conductor, wherein the core carrier tube contains a fill opening for slipping the current transformer core on the core carrier tube, and wherein the core carrier tube is configured to be connected to a switchgear housing by means of installation flanges wherein
   a) the fill opening is provided with a mounting contour that serves for absorbing axial forces and the outside diameter of which is smaller than an outside diameter of an installation flange for the core carrier tube, wherein
   b) a mounting means that serves for the installation of the core carrier tube in the region of the fill opening is configured to be mounted on the mounting contour and wherein an annular intermediate flange is arranged between the core carrier tube and the switchgear housing in order to mount the core carrier tube on the switchgear housing in the region of the fill opening, wherein said intermediate flange can be flanged on both sides and serves, in particular, as a counter flange for the mounting means that functions as the installation flange.

11. A current transformer, comprising a current transformer casing and at least one current transformer core that is arranged on a core carrier tube and serves for measuring a current flowing through a conductor, wherein the core carrier tube contains a fill opening for slipping the current transformer core on the core carrier tube, and wherein the core carrier tube is configured to be connected to a switchgear housing by means of installation flanges wherein
   a) the fill opening is provided with a mounting contour that serves for absorbing axial forces and the outside diameter of which is smaller than an outside diameter of an installation flange for the core carrier tube, wherein
   b) a mounting means that serves for the installation of the core carrier tube in the region of the fill opening is configured to be mounted on the mounting contour and wherein the mounting contour contains a projection and the projection engages with a groove on the mounting means.

* * * * *